United States Patent [19]

Turner et al.

[11] Patent Number: 5,000,033
[45] Date of Patent: Mar. 19, 1991

[54] O-RING GASKET TEST FIXTURE

[75] Inventors: James E. Turner; Donald S. McCluney, both of Huntsville, Ala.

[73] Assignee: The United States of America as represented by the Administrator of the National Aeronautics and Space Administration, Washington, D.C.

[21] Appl. No.: 361,479

[22] Filed: Jun. 5, 1989

[51] Int. Cl.⁵ ............................................. G01M 3/28
[52] U.S. Cl. ...................................................... 73/49.8
[58] Field of Search ................. 73/49.8, 46, 40; 277/2

[56] References Cited
U.S. PATENT DOCUMENTS
3,213,674 10/1965 Salcido et al. ........................ 73/49.8

Primary Examiner—John Chapman
Assistant Examiner—Joseph W. Roskos
Attorney, Agent, or Firm—Jerry L. Seemann; William J. Sheehan; John R. Manning

[57] ABSTRACT

An apparatus for testing O-ring gaskets under a variety of temperature, pressure, and dynamic loading conditions. Specifically, this apparatus has the ability to simulate a dynamic loading condition where the sealing surface in contact with the O-ring moves both away from and axially along the face of the O-ring.

17 Claims, 5 Drawing Sheets

O-RING GASKET TEST FIXTURE

ORIGIN OF THE INVENTION

The invention described herein was made by employees of the United States Government and may be manufactured and used by or for the Government for governmental purposes without the payment of any royalties thereon or therefor.

FIELD OF THE INVENTION

This invention relates to a machine or apparatus. Specifically, this invention pertains to an apparatus for testing the sealing characteristics of O-ring gaskets under a variety of conditions.

BACKGROUND INFORMATION

Prior to the present invention, typical test fixtures for testing the sealing characteristics of O-ring gaskets used as bore seals were of two types. First, there was the totally static fixture. This fixture, as its name implies, checked O-ring performance under a totally static configuration, i.e., neither surface in contact with the O-ring was allowed to move. The second type was a partially dynamic test fixture. Under this configuration, one of the surfaces in contact with the O-ring was allowed to rotate with respect to the O-ring during the test. In addition, axial movement across the face of the O-ring could also be simulated with the second test fixture. However, neither fixture could check the response of an O-ring gasket where there was radial movement of the sealing surface away from the O-ring, i.e., where the space or gap filled by the O-ring became enlarged.

The present invention was first discussed in NASA test reports covering various results of testing performed on the invention. One report was dated January 1987 and the other one was dated Dec. 22, 1987. Both reports were authored by James E. Turner, a coinventor of the present invention, and were restricted to NASA personnel and NASA contractors only. The invention was first disclosed to the public at a conference in a paper entitled "Evaluation of the Sealing Ability of Various O-ring Materials for the Space Shuttle Redesigned Solid Rocket Motor," which was presented on June 7, 1988.

SUMMARY OF THE INVENTION

The present invention has the ability to test the sealing characteristics of O-ring gaskets under a variety of dynamic loading conditions. Where an O-ring is expected to perform a sealing function against a high-pressure fluid, the present invention allows the O-ring to be checked under various combinations of parameters. These parameters include (1) temperature, (2) pressure, (3) rate of pressurization, (4) magnitude of radial gap-opening, (5) rate of radial gap-opening, (6) pressurization as a function of gap-opening, and (7) position of the O-ring gasket in the O-ring gland prior to pressurization. The term "gap-opening" refers to the condition where the space filled by the O-ring enlarges due to some external force. Thus, where the installed O-ring has to react to some gap-opening in order to maintain an effective seal, the present invention has the capability to simulate both the maximum gap-opening expected to occur in practice and the rate at which the gap opens.

An object of the present invention is to check the sealing ability of an O-ring gasket as the sealing surface moves away from the O-ring.

Another object of this invention is to check the sealing ability of an O-ring gasket both as the sealing surface moves away from the O-ring and as the sealing surface slides in an axial direction across the face of the O-ring.

BRIEF DESCRIPTION OF THE DRAWINGS

Further details of the present invention are explained below with the help of the attached drawings in which.

DESCRIPTION OF THE PREFERRED EMBODIMENTS

A preferred embodiment of the present invention comprises a housing, a conical piston, a pressurizing means, and a means for controlling movement of the conical piston relative to the housing.

Figure 1A:
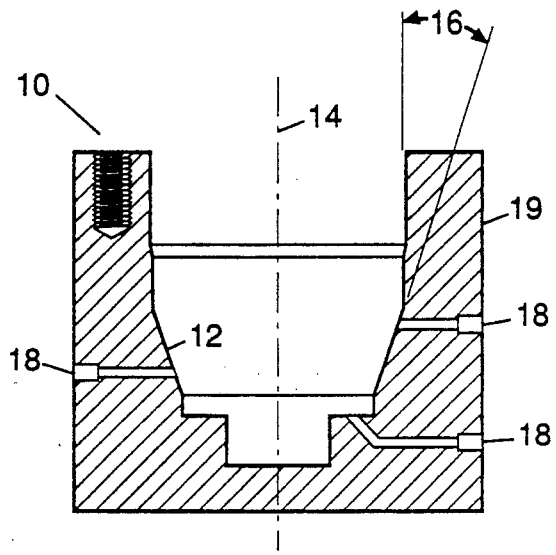
FIGS. 1A and 1B represent a sectional view and a top view, respectively, of the housing belonging to the present invention.
Figure 1B:
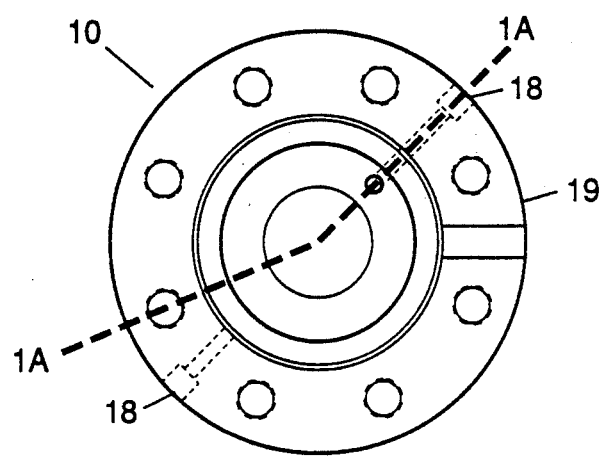

FIGS. 1A and 1B show a housing (10) of the present invention having a conical bore (12). The conical bore (12) tapers or inclines from a line parallel to a longitudinal axis (14) of the conical bore (12) at a predetermined angle (16). The angle is computed from the ratio of the desired magnitude of radial gap-opening to the desired magnitude of axial displacement. The housing also contains a variety of ports (18) which extend between an exterior surface (19) of the housing (10) and the conical bore (12). These ports (18) are located to facilitate pressurization where appropriate and to monitor the amount and rate of fluid leakage past the O-ring seals.

Figure 2A:
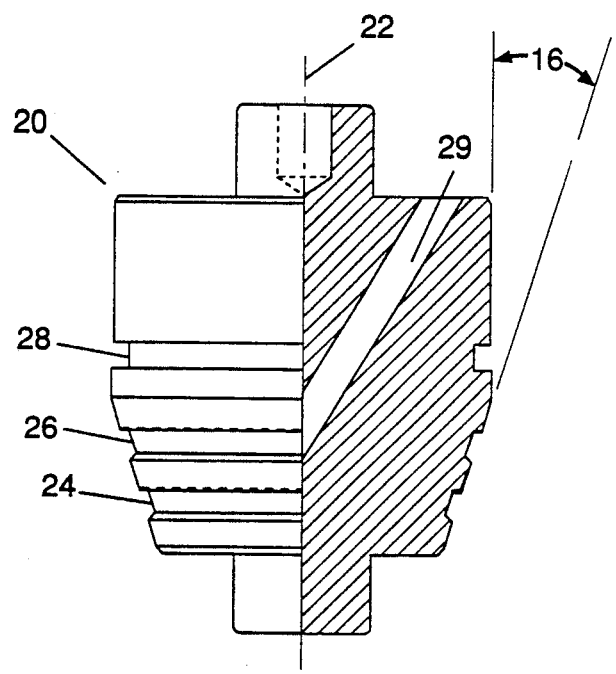
FIGS. 2A and 2B represent a sectional view and a top view, respectively, of the conical piston belonging to the present invention.
Figure 2B:
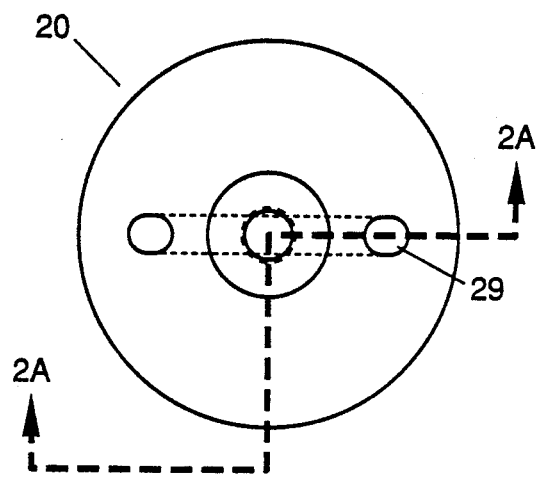

FIGS. 2A and 2B show a conical piston (20) having a longitudinal axis (22). The conical piston (20) tapers or inclines from the longitudinal axis (22) at the same angle (16) as that of the conical bore (12) in the housing (10). The purpose of this angle is, here again, to produce a given amount of radial gap-opening for a given amount of axial displacement along the O-ring. The conical piston (20) also has a first gland (24) in which an O-ring gasket is placed for testing. A second gland (26) may be provided for a second O-ring gasket in order to contain or monitor secondary leakage subsequent to any leakage past the O-ring in the first gland (24) A third gland (28) may be provided to contain or monitor the amount of any leakage past the O-ring in the second gland (26). Each gland has a high pressure or upstream side and a low pressure or downstream side. A passageway (29) can be provided in the piston (20) through which a fluid at the desired temperature may be circulated to control the testing temperature.

Figure 3A:
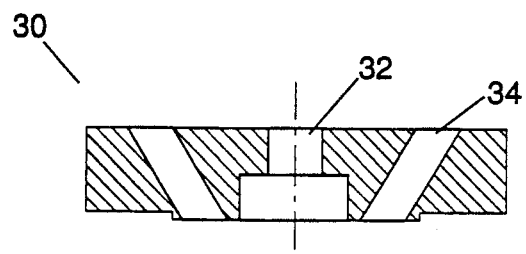
FIGS. 3A and 3B represent a sectional view and a top view, respectively, of the cap plate belonging to the present invention.
Figure 3B:
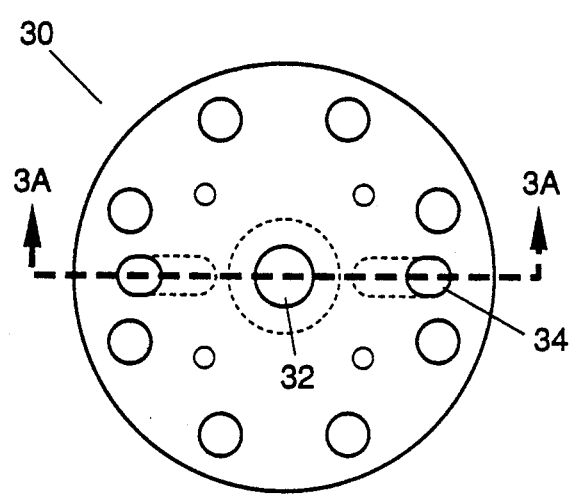

FIGS. 3A and 3B show a cap plate (30). The cap plate (30) functions as another part of the housing (10) and is used to enclose or restrain the conical piston (20) during testing. The cap plate (30) has an opening (32) through which the movement of the piston (20) is controlled. The cap plate may further have another passageway (34) to match the passageway (29) in the piston (20) to aid in temperature control.

Figure 4:
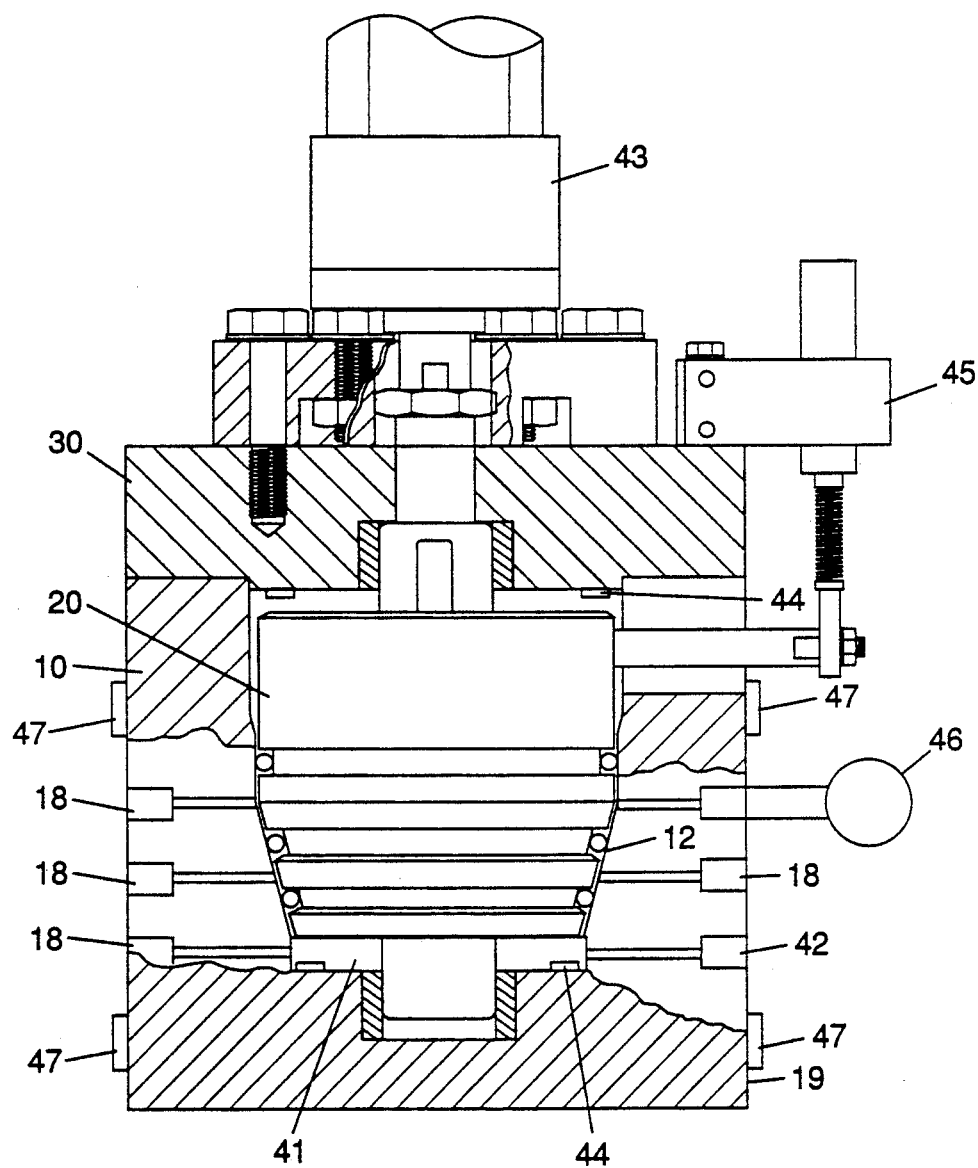
FIG. 4 shows a preferred embodiment of the completely assembled O-ring testing apparatus.

FIG. 4 shows the housing (10), the conical piston (20), and the cap plate (30) of the present invention completely assembled. The piston (20) is slidably mounted within the housing (10) such that the piston (20) is coaxial with the conical bore (12) of the housing (10). With the piston (20) in the housing (10), a chamber (41) is formed between the housing (10) and the piston (20). During testing operations, the chamber (41) is pressurized through a pressurization port (42) which extends between the chamber (41) and the exterior surface (19) of the housing (10). The ports (18) are usually arranged in the housing (10) so there is access to the spaces between the housing (10) and the piston (20) and between adjacent O-rings. The ports (18 and 42) are used for pressurization and to monitor any leakage which may occur. Leakage past the O-ring gasket may be detected with the use of a pressure transducer (46).

FIG. 4 also shows a hydraulic actuator (43) attached to piston (20) as a means for controlling piston movement. The hydraulic actuator (43) may be used to control both the rate and magnitude of radial gap movement. To more precisely control the initial gap-opening and the final gap-opening, shims (44) may be provided between the housing (10) and the piston (20) or between the housing (10) and the cap plate (30) as shown in FIG. 4.

FIG. 4 further shows a displacement transducer (45) installed between the piston (20) and the housing (10). This transducer (45) is used to monitor the rate and amount of coaxial movement of the piston (20) relative to the housing (10). The housing (10) may be provided with a heating mechanism (not shown) to heat the O-rings to the desired temperature. An example of a heating mechanism would be to wrap the housing (10) with electrical heating strips (47). Cooling of the O-ring gaskets may be accomplished by passing a coolant such as liquid nitrogen through the passageways (FIG. 2, 29 and FIG. 3, 34) in the piston (20) and cap plate (30). Alternatively, cooling of the O-rings may be obtained by refrigerating the testing apparatus.

Figure 5:
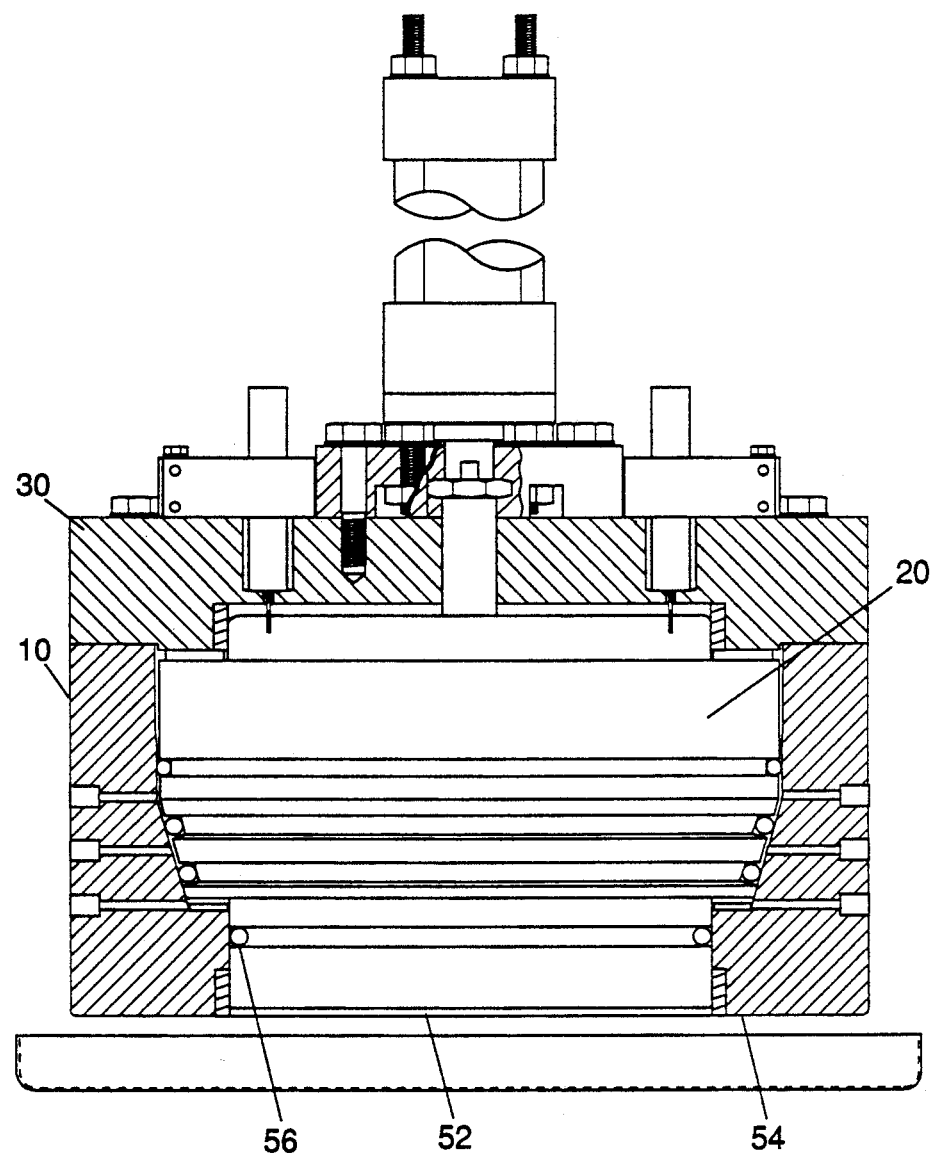
FIG. 5 shows an alternative embodiment, completely assembled, of the present invention.

FIG. 5 shows an alternative embodiment which may be better suited for testing larger diameter O-rings. This embodiment is basically the same as that shown in FIG. 4 except the housing is modified. Here, the housing (10) has an opening (52) on the pressurization end (54) which is sealed with another O-ring gasket (56).

Still another embodiment (not shown) is where the housing and conical piston in the vicinity of the first gland can be separated from and reattached to the remainder of the housing and conical piston, respectively. Such a configuration has the advantage of allowing long term storage of the O-ring gasket under compression prior to testing while allowing continued use of the other parts. Thus, minimal duplication of the testing apparatus is attained where multiple tests are to be run which require long term compression of the O-ring prior to testing.

The procedure for using the present invention is straight forward. First, the O-ring to be tested is placed in the first O-ring gland. Other O-rings are also placed on the remaining glands where necessary or desired as part of the first step. If desired, the O-rings may first be coated with a lubricant prior to placing them in the gland. Second, shims may be selected to provide predetermined initial and final positions of the piston relative to the housing. Third, the piston and the shims, if used, are secured within the housing by attaching the cap plate to the housing. Fourth, any desired instrumentation is connected to the test fixture. Finally, after bringing the O-rings to the desired temperature by either heating or cooling the apparatus, the chamber is pressurized at a selected rate to the desired maximum pressure. The rate of pressurization may also be coordinated with the rate of radial gap-opening. During pressurization, the performance of the O-ring gasket can be observed and recorded.

If it is desired to properly center and seat the O-ring in the gland prior to checking its sealing characteristics, the O-ring can be pressurized slightly from both sides prior to applying the test pressure.

What is claimed is:

1. An apparatus for testing O-ring gaskets, comprising:
   a housing, said housing having a conical bore, said conical bore further having a longitudinal axis;
   a conical piston having a longitudinal axis, said conical piston is located within said housing and said longitudinal axis of said conical piston is aligned with said longitudinal axis of said conical bore in said housing, whereby a chamber is formed between said housing and said conical piston, said conical piston also having a first gland for holding an O-ring gasket, said first gland having an upstream side and a downstream side;
   a means for pressurizing said chamber; and
   a means for controlling movement of said conical piston relative to said housing along said axes,
   a means for detecting leakage past an O-ring gasket.

2. An apparatus for testing O-ring gaskets as recited in claim 1, wherein said means for detecting leakage comprises a pressure transducer.

3. An apparatus for testing O-ring gaskets as recited in claim 1, further comprising a means for measuring movement of said conical piston relative to said housing along said axes.

4. An apparatus for testing O-ring gaskets as recited in claim 3, wherein said means for measuring movement comprises a displacement transducer.

5. An apparatus for testing O-ring gaskets as recited in claim 1, further comprising a means for controlling temperature of said housing and said conical piston.

6. An apparatus for testing O-ring gaskets as recited in claim 5, wherein said means for controlling temperature comprises a passageway in said conical piston through which a fluid is circulated at a predetermined temperature.

7. An apparatus for testing O-ring gaskets as recited in claim 5, wherein said means for controlling temperature comprises an electrical heat strip wrapped around said housing.

8. An apparatus for testing O-ring gaskets as recited in claim 5, wherein said means for controlling temperature comprises cooling said housing and said conical piston with external refrigeration.

9. An apparatus for testing O-ring gaskets as recited in claim 1, wherein said means for pressurizing comprises a pressurization port having access to an area between said housing and said conical piston and adjacent to said upstream side of said first gland through which a fluid is supplied to said chamber under pressure.

10. An apparatus for testing O-ring gaskets as recited in claim 1, wherein said means for controlling movement comprises a hydraulic actuator attached to said conical piston.

11. An apparatus for testing O-ring gaskets as recited in claim 1, further comprising a cap plate attached to said housing for restraining said conical piston during pressurization of said chamber.

12. An apparatus for testing O-ring gaskets as recited in claim 11, further comprising a first shim of a predetermined thickness located between said conical piston and said housing for controlling an initial position of said conical piston relative to said housing.

13. An apparatus for testing O-ring gaskets as recited in claim 11, further comprising a second shim of a predetermined thickness located between said conical piston and said cap plate for controlling a final position of said conical piston relative to said housing.

14. An apparatus for testing O-ring gaskets as recited in claim 1, further comprising:
 a second gland located adjacent to said downstream side of said first gland on said conical piston, said second gland having an upstream side and a downstream side; and
 a primary leakage port in said housing, said primary leakage port having access to an area between said housing and said conical piston and between said first gland and said second gland.

15. An apparatus for testing O-ring gaskets as recited in claim 14, further comprising:
 a third gland located adjacent to said downstream side of said second gland on said conical piston; and
 a secondary leakage port in said housing, said secondary leakage port having access to an area between said housing and said conical piston and between said second gland and said third gland.

16. An apparatus for testing O-ring gaskets as recited in claim 1, wherein said housing has an opening adjacent to said chamber, and said chamber is sealed from said opening with an O-ring gasket.

17. An apparatus for testing O-ring gaskets as recited in claim 1,
 wherein said conical piston comprises at least two parts, one of said two parts of said conical piston consisting of a portion of said piston having said first gland, and
 wherein said housing comprises at least two parts, one of said two parts of said housing consisting of a portion of said housing adjacent to said first gland of said piston,
 whereby said part of said piston having said first gland and said part of said housing adjacent to said first gland are capable of holding an O-ring gasket in compression for a period of time prior to testing.

* * * * *